US010096999B2

(12) United States Patent
She et al.

(10) Patent No.: US 10,096,999 B2
(45) Date of Patent: Oct. 9, 2018

(54) GAS TUBE-SWITCHED FLEXIBLE ALTERNATING CURRENT TRANSMISSION SYSTEM

(71) Applicant: General Electric Company, Schenectady, NY (US)

(72) Inventors: Xu She, Niskayuna, NY (US); James William Bray, Niskayuna, NY (US); Timothy John Sommerer, Ballston Spa, NY (US); Rahul Shantilal Chokhawala, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 286 days.

(21) Appl. No.: 15/199,367

(22) Filed: Jun. 30, 2016

(65) Prior Publication Data
US 2018/0006461 A1   Jan. 4, 2018

(51) Int. Cl.
*H02J 3/18*        (2006.01)
*G05B 19/05*       (2006.01)
*H02M 1/00*        (2006.01)

(52) U.S. Cl.
CPC ............... *H02J 3/18* (2013.01); *G05B 19/05* (2013.01); *H02J 3/1842* (2013.01); *H02J 3/1864* (2013.01); *H02M 1/0061* (2013.01); *G05B 2219/15097* (2013.01)

(58) Field of Classification Search
CPC .......... H02J 3/18; H02J 3/1842; H02J 3/1864; H02M 1/0061; G05B 19/05; G05B 2219/15097
See application file for complete search history.

(56) References Cited

U.S. PATENT DOCUMENTS

| 3,539,871 A | 11/1970 | Schneider et al. |
| 6,057,673 A | 5/2000 | Okayama |
| 6,075,349 A | 6/2000 | Okayama |
| 6,172,488 B1 * | 1/2001 | Mizutani ............... H02J 3/1814 323/207 |

(Continued)

FOREIGN PATENT DOCUMENTS

| CN | 102593859 B | 1/2014 |
| WO | 2014143100 A1 | 9/2014 |

OTHER PUBLICATIONS

Hingorani, N.G., and Gyugyi, L., "Understanding FACTS : concepts and technology of flexible AC transmission systems, Chapter 1: FACTS Concept and General System Considerations; Chapter 5: Static Shunt Compensators: SVC and STATCOMM," IEEE Press, pp. 82, (1999).

(Continued)

*Primary Examiner* — Emily P Pham
(74) *Attorney, Agent, or Firm* — GE Global Patent Operation; Nitin Joshi

(57) ABSTRACT

A var compensator circuit is provided. The var compensator circuit includes a gas tube switch and a reactive impedance. The gas tube switch is configured to be coupled to a transmission line. The transmission line is configured to deliver real power and reactive power to a load at an alternating current (AC) line voltage. The reactive impedance is configured to be coupled to the transmission line at the AC line voltage through the gas tube switch. The reactive impedance is configured to modify the reactive power configured to be delivered to the load.

20 Claims, 5 Drawing Sheets

(56) References Cited

U.S. PATENT DOCUMENTS

| | | | |
|---|---|---|---|
| 6,282,075 B1 | 8/2001 | Chaudhry | |
| 6,775,121 B1 | 8/2004 | Chaudhry | |
| 7,106,178 B1 | 9/2006 | Carson et al. | |
| 9,531,182 B2 * | 12/2016 | Boe .......................... | H02J 3/18 |
| 2010/0001698 A1 * | 1/2010 | Johnson ................ | H02J 3/1864 |
| | | | 323/209 |
| 2011/0241757 A1 | 10/2011 | Johnson | |
| 2012/0112714 A1 * | 5/2012 | Agudo Araque ..... | H02J 3/1842 |
| | | | 323/210 |
| 2014/0055116 A1 | 2/2014 | Hosini et al. | |
| 2015/0270772 A1 | 9/2015 | Bimbach | |

OTHER PUBLICATIONS

Extended European Search Report and Opinion issued in connection with corresponding EP Application No. 17174891.6 dated Oct. 30, 2017.

P A Pincosy et al., "High-pressure gas switch for a wideband source", High-Power Particle Beams, 1992 9th International Conference on, vol. 1, pp. 646-651, May 25-29, 1992, Washington,DC.

Okayama et al., "Application and development concepts for a new transformer-less FACTS device—the multimode static series compensator (MSSC)", Transmission and Distribution Conference and Exposition, 2003 IEEE PES, vol. 3, pp. 1138-1142, Sep. 7-12, 2003.

* cited by examiner

GAS TUBE-SWITCHED FLEXIBLE ALTERNATING CURRENT TRANSMISSION SYSTEM

STATEMENT REGARDING FEDERALLY SPONSORED RESEARCH & DEVELOPMENT

This invention was made with Government support under contract number DE-AR0000298 awarded by the Department of Energy. The Government has certain rights in this invention.

BACKGROUND

The field of the disclosure relates generally to flexible alternating current transmission systems (FACTS) and, more particularly, to gas tube-switched FACTS and methods of use.

Many known electrical loads include both real and reactive components. For example, and without limitation, an electric motor is an inductive load, where an induction coil is energized to turn a rotor. Real power facilitates performance of work, such as driving a mechanical load on the electric motor, while reactive power facilitates storage of power due to a phase difference between transmitted voltage and transmitted current. Real power, P, is generally expressed in Watts. Reactive power, Q, is generally expressed in voltage-ampere reactive (var). Apparent power is a vector sum of real and reactive power, and is calculable as a product of a circuit's voltage and current. Apparent power, S, is accordingly expressed in voltage-amperes (VA).

Known power transmission systems deliver electrical power to electrical loads over transmission lines. The quality of the delivered power is characterized by a power factor, which is defined as a ratio of real power to apparent power, i.e., P:S. For purely resistive loads, the power factor is one, i.e., 1:1. For purely reactive loads, the power factor is zero, i.e., 0:1. Low power factors generally indicate inefficient power transmission, as the accompanying reactive load demands increased apparent power to achieve a demanded real power, resulting in increased heat loss due to increased current levels. Conversely, too little reactive power in a transmission system can degrade performance of transformers and transmission lines, resulting in poor voltage regulation, lower margins to voltage collapse, or poor power flow.

Some known power transmission systems include one or more var compensators to improve power transmission quality and efficiency by supplying additional reactive power to the system, thereby improving power factor, voltage regulation, voltage stability, and power flow. Known var compensators typically include an inductance or a capacitance that is coupled to the transmission line through one or more switches. The inductance or capacitance in some known var compensators includes a fixed passive capacitor or inductor. In other known var compensators, the inductance or capacitance includes power electronic devices or a combination of fixed passive devices and power electronics. When connected and energized, the inductance operates as a reactive current source and the capacitance operates as a reactive voltage source. In high voltage power transmission systems, var compensators typically utilize numerous devices in series to achieve the desired effect. Similarly, var compensators for high voltage power transmission systems generally require a transformer to interface between the transmission lines and the various devices of the var compensator. Consequently, selecting a var compensator for a given power transmission system typically includes a balance of high blocking voltage, low conduction losses, and low switching losses.

BRIEF DESCRIPTION

In one aspect, a var compensator circuit is provided. The var compensator circuit includes a gas tube switch and a reactive impedance. The gas tube switch is configured to be coupled to a transmission line. The transmission line is configured to deliver real power and reactive power to a load at an alternating current (AC) line voltage. The reactive impedance is configured to be coupled to the transmission line at the AC line voltage through the gas tube switch. The reactive impedance is configured to modify the reactive power configured to be delivered to the load.

In another aspect, a var compensator circuit is provided. The var compensator circuit includes a gas tube switching network and a controller. The gas tube switching network is configured to be coupled between a transmission line and a reactive impedance. The transmission line is configured to deliver real power and reactive power to a load at an AC line voltage. The reactive impedance is configured to modify the reactive power configured to be delivered to the load. The gas tube switching network includes at least one gas tube switch. The controller is coupled to the gas tube switching network. The controller is configured to selectively commutate the gas tube switch to couple the reactive impedance to the transmission line and apply the AC line voltage to the reactive impedance.

In yet another aspect, a flexible alternating current transmission system (FACTS) is provided. The FACTS includes a transmission line, a gas tube switching network, a controller, and a reactive impedance. The transmission line is coupled between a power source and a load. The transmission line is configured to deliver real power and reactive power to the load at an AC line voltage. The gas tube switching network is coupled to the transmission line. The gas tube switching network includes a plurality of gas tube switches. The controller is coupled to the gas tube switching network and configured to regulate the plurality of gas tube switches based on a measured AC line voltage and a measured AC line current. The reactive impedance is configured to be coupled to the transmission line through the gas tube switching network at the AC line voltage. The reactive impedance is configured to generate additional reactive power.

DRAWINGS

These and other features, aspects, and advantages of the present disclosure will become better understood when the following detailed description is read with reference to the accompanying drawings in which like characters represent like parts throughout the drawings, wherein.

Figure 1:
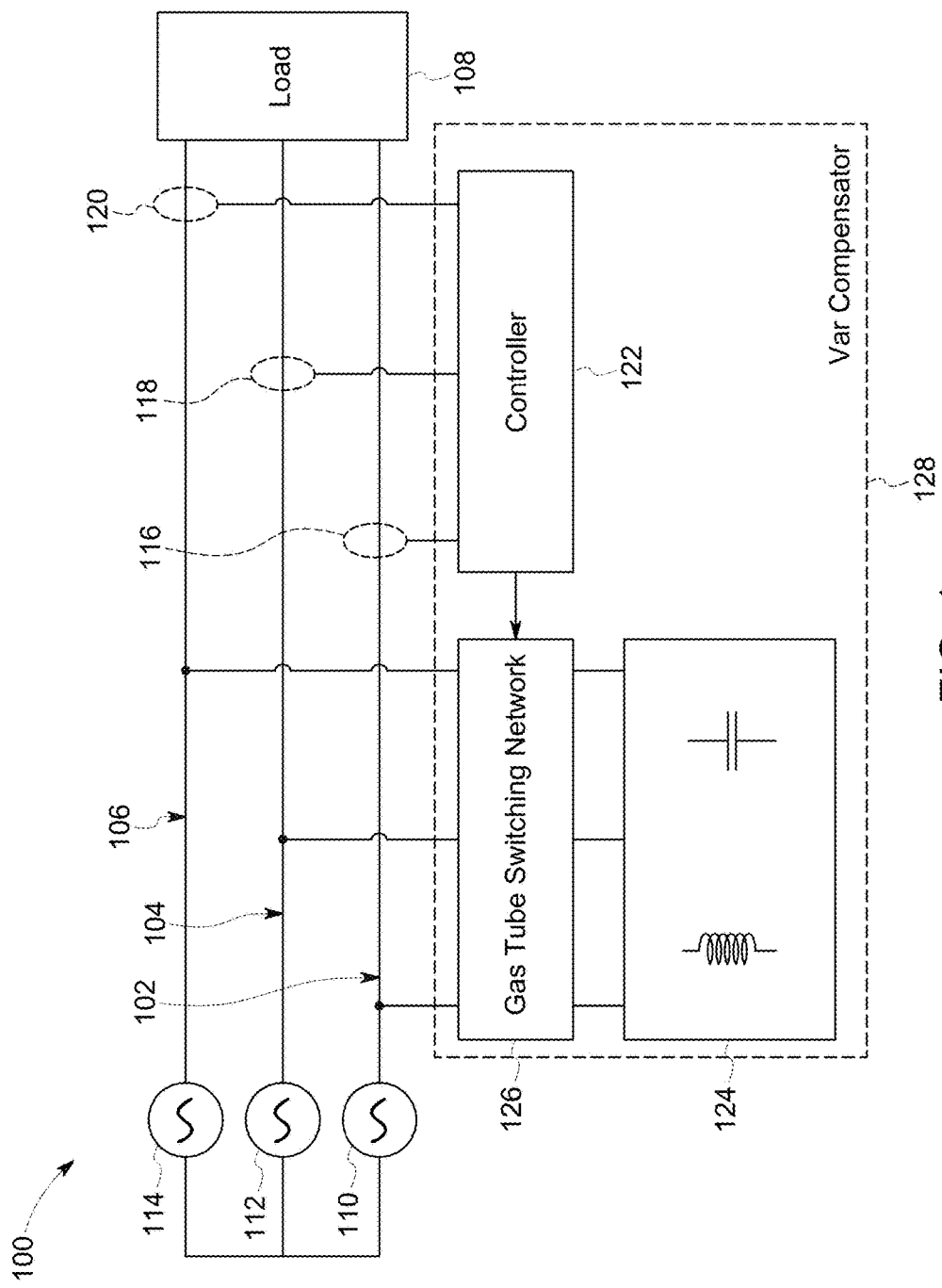
FIG. 1 is a block diagram of an exemplary flexible AC transmission system (FACTS)

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Embodiments of the present disclosure relate to flexible alternating current transmission systems (FACTS). FACTS described herein provide gas tube switched compensators that improve power factor, voltage regulation, voltage stability, and power flow for the transmission lines. Gas tube switching provides high voltage ratings that eliminate the need for transformers in line with the compensation circuit. Gas tube switching provides low switching losses, facilitating operation at high switching frequencies to improve filtering of harmonics on the transmission lines. FACTS described herein include at least one gas tube switch between a transmission line and a reactive impedance, such as a capacitor or an inductor. In some FACTS described herein, a network of gas tube switches provides fully controllable voltage-ampere reactive (var) compensation, including high-frequency turn-on and turn-off capability, ability to open against current flow, and bidirectional voltage and current blocking.

FIG. 1 is a block diagram of an exemplary FACTS 100. FACTS 100 includes transmission lines 102, 104, and 106 that deliver real and reactive power to a load 108. Load 108 includes any electrical load that consumes AC power, including, for example, and without limitation, motors, lighting, house hold appliances, amplifiers, transformers, AC-DC converters, energy storage devices, solenoids, heating elements, medical equipment, industrial equipment, and other electronic circuits. For the purpose of describing FACTS 100, load 108 is characterized by both a real load component and a reactive load component. Power delivered to load 108 is provided by power sources 110, 112, and 114. Power sources 110, 112, and 114 include any suitable electrical power source, including, for example, and without limitation, DC power sources such as batteries and solar cells in conjunction with one or more DC-AC power conversion device, and AC power sources such as generators turned by wind turbines, steam turbines, and gas turbines. Power sources 110, 112, and 114 respectively transmit AC power onto transmission lines 102, 104, and 106. In certain embodiments, power sources 110, 112, and 114 include various power electronics to convert generated power to the line voltage of transmission lines 102, 104, and 106. Such power electronics include, for example, and without limitation, transformers and power converters.

FACTS 100 is configured as a three-phase transmission system, where AC power generated by each of power sources 110, 112, and 114 is out of phase from each other. Each of transmission lines 102, 104, and 106 conducts a single phase, typically referred to as phases A, B, and C. In alternative embodiments, FACTS 100 includes any number of phases suitable for delivering power to load 108. For example, and without limitation, FACTS 100 may include a single phase. In other embodiments, FACTS 100 may include six phases.

AC power transmitted onto transmission lines 102, 104, and 106 by power sources 110, 112, and 114 is transmitted at a line voltage and a line frequency. Line voltages range from fractions of a volt to several hundred thousand volts, depending on the application. High voltage transmission lines operate at a line voltage in excess of 10,000 volts. Some high voltage transmission lines operate at a line voltage in excess of 100,000 volts. Line currents conducted by transmission lines 102, 104, and 106 range up to several thousand amperes. Line frequencies vary, though not as widely as line voltages. In the United States, for example, line frequencies are typically 60 Hertz. Other countries use 50 Hertz line frequencies. In many aircraft, for example, 400 Hertz transmission lines are common.

Load 108 draws some amount of apparent power, S, expressed in volt-amperes (VA). The apparent power is a combination of real power, P, expressed in Watts, drawn by the real component of load 108 and reactive power, Q, expressed in var, drawn by the reactive component of load 108. FACTS 100 includes sensors 116, 118, and 120 configured to measure respective voltages and currents of transmission lines 102, 104, and 106. Sensors 116, 118, and 120 include, for example, and without limitation, voltage sensors and current sensors. FACTS 100 further includes a controller 122 communicatively coupled to sensors 116, 118, and 120. Controller 122 receives measured voltages and currents from sensors 116, 118, and 120 and determines values of real power, P, and reactive power, Q, transferred to load 108 through transmission lines 102, 104, and 106.

FACTS 100 includes a reactive impedance 124 configured to be coupled to transmission lines 102, 104, and 106. Reactive impedance 124 includes at least one of an inductive device and a capacitive device. In certain embodiments, for example, and without limitation, reactive impedance 124 includes one or more passive capacitors, one or more passive inductors, or a combination of capacitors and inductors.

FACTS 100 includes a gas tube switching network 126 coupled between reactive impedance 124 and transmission lines 102, 104, and 106. Gas tube switching network 126 includes one or more gas tube switches that couple reactive impedance 124 to at least one of transmission lines 102, 104, and 106. Gas tube switching network 126 operates at the line voltage for transmission lines 102, 104, and 106 without transformers for stepping up voltages of reactive impedance 124 to line voltages.

FACTS 100 is configured such that gas tube switching network 126 couples reactive impedance 124 in a shunt configuration. In alternative embodiments, gas tube switching network 126 couples reactive impedance 124 in series with transmission lines 102, 104, and 106. When connected, reactive impedance 124 injects compensatory reactive power, $Q_{comp}$, onto transmission lines 102, 104, and 106. The injected reactive power modifies the total reactive power, Q, on transmission lines 102, 104, and 106.

For example, and without limitation, when reactive power, Q, is capacitive, i.e., line current leads line voltage in phase, the injected reactive power, $Q_{comp}$, can increase or decrease the phase difference between line current and line voltage. More specifically, gas tube switching network 126 couples capacitive components of reactive impedance 124, acting as voltage sources, to increase the phase difference between line current and line voltage to a desired balance of real power, P, and reactive power, Q. Similarly, gas tube switching network 126 couples inductive components of reactive impedance 124, acting as current sources, to decrease the phase difference between line current and line voltage to the desired balance of real power, P, and reactive power, Q.

Conversely, for example, and without limitation, when reactive power, Q, is inductive, i.e., line current lags line voltage in phase, the injected reactive power, $Q_{comp}$, can either increase or decrease the phase difference between line current and line voltage. More specifically, gas tube switching network 126 couples capacitive components of reactive impedance 124, acting as voltage sources, to decrease the phase difference between line current and line voltage to the desired balance of real power, P, and reactive power, Q. Similarly, gas tube switching network 126 couples inductive components of reactive impedance 124, acting as current sources, to increase the phase difference between line current and line voltage to the desired balance of real power, P, and reactive power, Q.

Gas tube switching network 126 is communicatively coupled to controller 122. Controller 122 is configured to regulate coupling of reactive impedance 124 to transmission lines 102, 104, and 106 through gas tube switching network 126. Controller 122 regulates gas tube switching network 126 based on line voltages and line currents measured using sensors 116, 118, and 120. For example, and without limitation, controller 122 determines reactive power, Q, on transmission lines 102, 104, and 106 based on measured voltages and currents. Controller 122 then determines a desired balance of reactive power, Q, and real power, P, to be delivered to load 108. Controller 122 regulates gas tube switching network 126 to couple an appropriate compensatory reactive power, $Q_{comp}$, to modify the total reactive power, Q, on transmission lines 102, 104, and 106. Together, controller 122, reactive impedance 124, and gas tube switching network 126 form a var compensator circuit 128.

Controller 122 further regulates gas tube switching network 126 to maintain the desired balance of real power, P, and reactive power, Q, in real time. Gas tube switching network 126 is fully controllable, facilitating gate-controlled turn-on and turn-off capability. Controller 122 operates individual gas tube switches of gas tube switching network 126 at switching frequencies in excess of 200 Hertz. In certain embodiments, controller 122 operates gas tube switching network 126 at 2000 Hertz with low switching losses. Gas tube switching network 126 is further operable with low conduction losses and bi-directional voltage and current blocking. Gas tube switching network 126 is further configured to ride out transient fault current surges.

Figure 2:
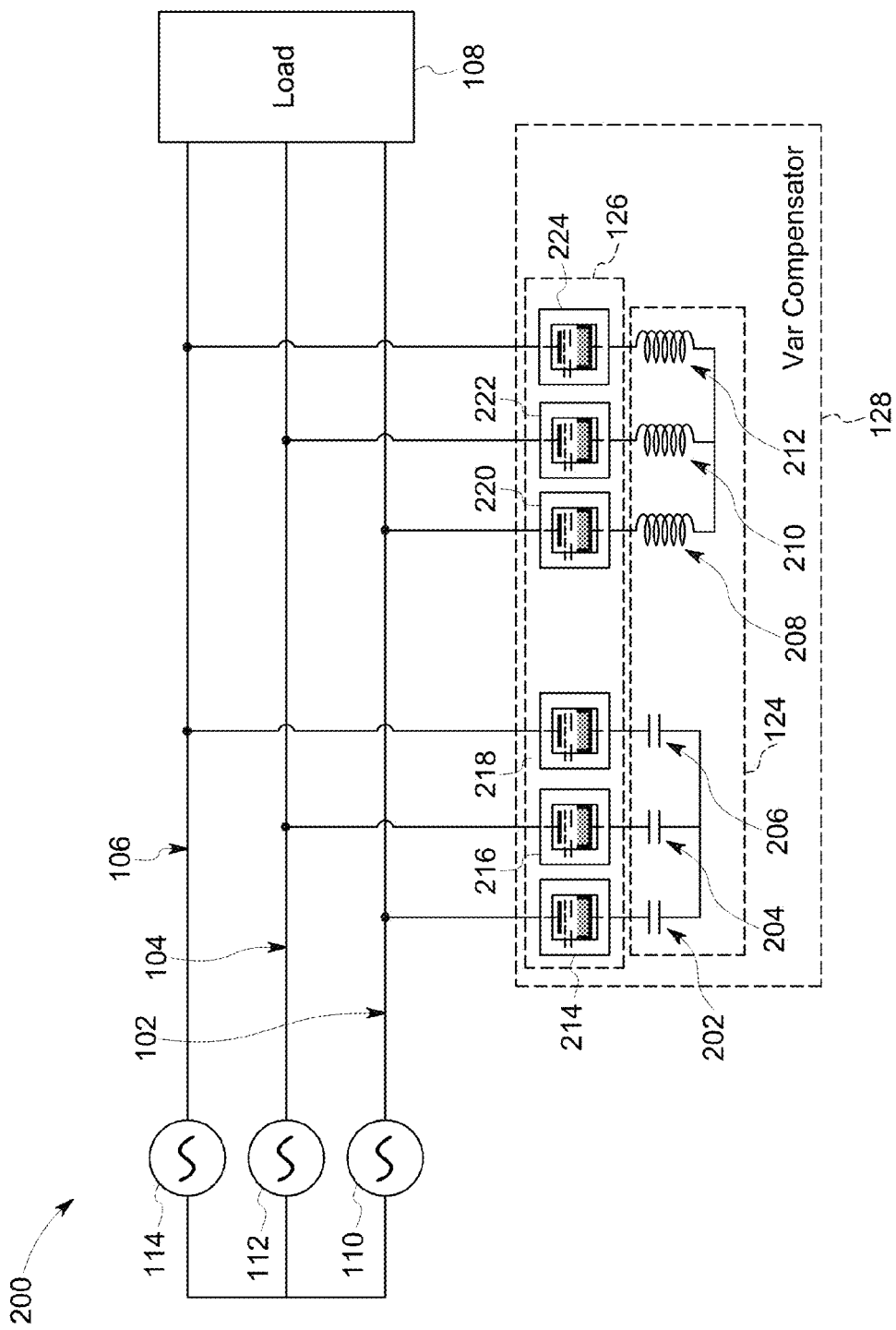
FIG. 2 is a block diagram of an alternative FACTS.

FIG. 2 is a block diagram of another exemplary FACTS 200. FACTS 200 includes transmission lines 102, 104, and 106, load 108, power sources 110, 112, and 114, and var compensator 128. In FACTS 200, var compensator 128 includes reactive impedance 124 and gas tube switching network 126.

Reactive impedance 124 includes static shunt capacitors 202, 204, and 206. Reactive impedance 124 further includes static shunt inductors 208, 210, and 212. Gas tube switching network 126 includes gas tube switches 214, 216, 218, 220, 222, and 224. Each of gas tube switches 214, 216, 218, 220, 222, and 224 directly couples one of shunt capacitors 202, 204, and 206 or shunt inductors 208, 210, and 212 to a respective transmission line of transmission lines 102, 104, and 106. Gas tube switches 214, 216, 218, 220, 222, and 224 provide gate-turn-on and gate-turn-off capability. In alternative embodiments, gas tube switches 214, 216, 218, 220, 222, and 224 are configured in a line-commutated circuit, although gate-controlled is generally preferred.

Figure 3:
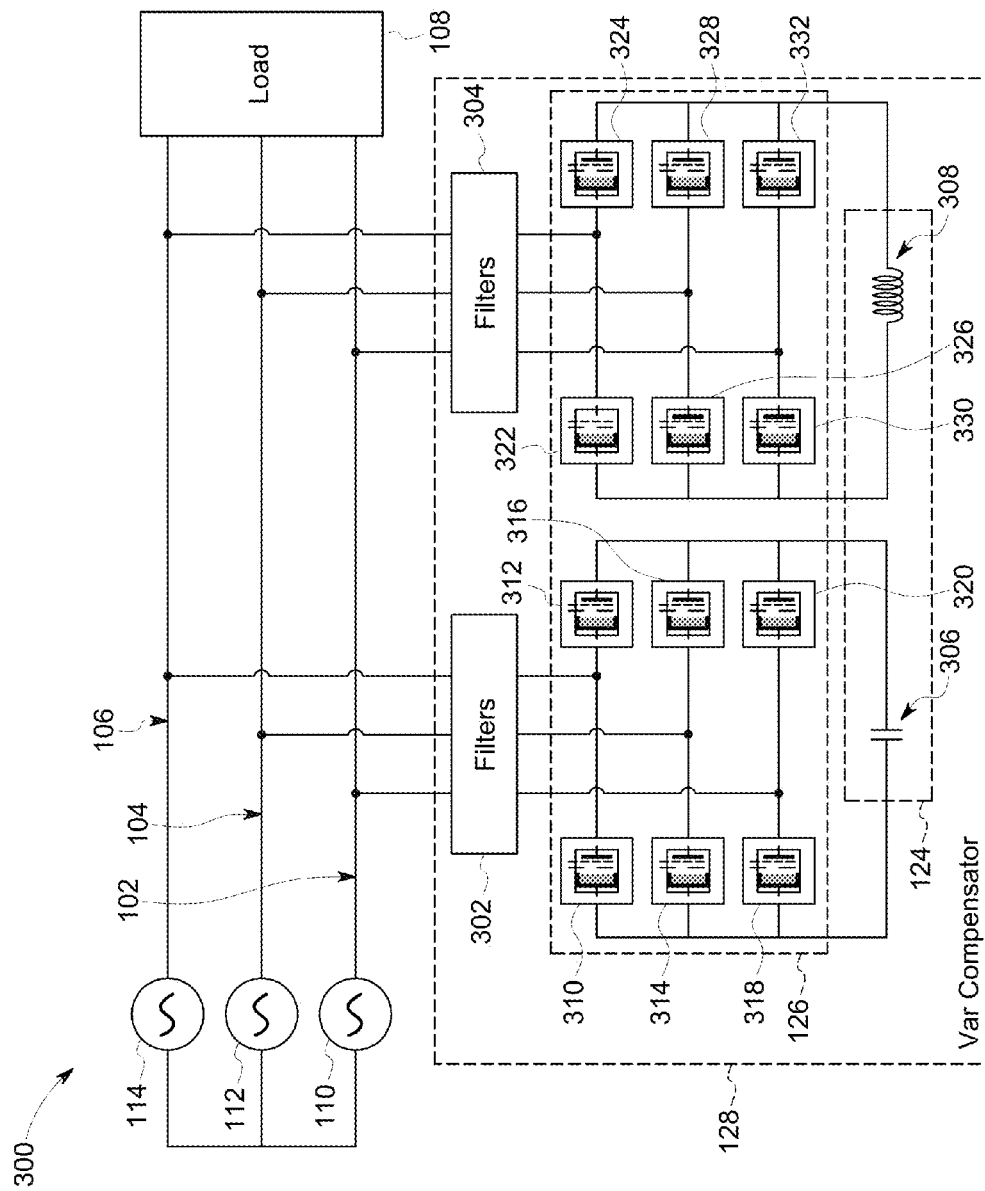
FIG. 3 is a block diagram of another alternative FACTS.

FIG. 3 is a block diagram of another exemplary FACTS 300. FACTS 300 includes transmission lines 102, 104, and 106, load 108, power sources 110, 112, and 114, and var compensator 128.

In FACTS 300, var compensator 128 includes reactive impedance 124 and gas tube switching network 126 (shown in FIG. 1), in addition to filters 302 and 304. Filters 302 and 304 facilitate injection of compensatory reactive power, $Q_{comp}$, independent of line voltages and line currents on transmission lines 102, 104, and 106. Given the high switching frequencies of gas tube switching network 126 and the resulting improved dynamic response, var compensator 128 injects harmonic current to compensate for current harmonics present on transmission lines 102, 104, and 106. Such compensation is sometimes referred to as transmission line active power filtering.

Reactive impedance 124 includes a capacitance 306 and an inductance 308. Capacitance 306 and inductance 308 are configured to be coupled to transmission lines 102, 104, and 106 through gas tube switching network 126. Gas tube switching network 126 includes gas tube switches 310, 312, 314, 316, 318, 320, 322, 324, 326, 328, 330, and 332. Gas tube switches 310, 312, 314, 316, 318, and 320 form a network for coupling capacitance 306 to transmission lines 102, 104, and 106. Likewise, gas tube switches 322, 324, 326, 328, 330, and 332 form a network for coupling inductance 308 to transmission lines 102, 104, and 106. Gas tube switches 310, 312, 314, 316, 318, 320, 322, 324, 326, 328, 330, and 332 are arranged in pairs for isolating var compensator 128's respective connections to transmission lines 102, 104, and 106. Such pairs include gas tube switches 310 and 312, 314 and 316, 318 and 320, 322 and 324, 326 and 328, and 330 and 332.

Figure 4:
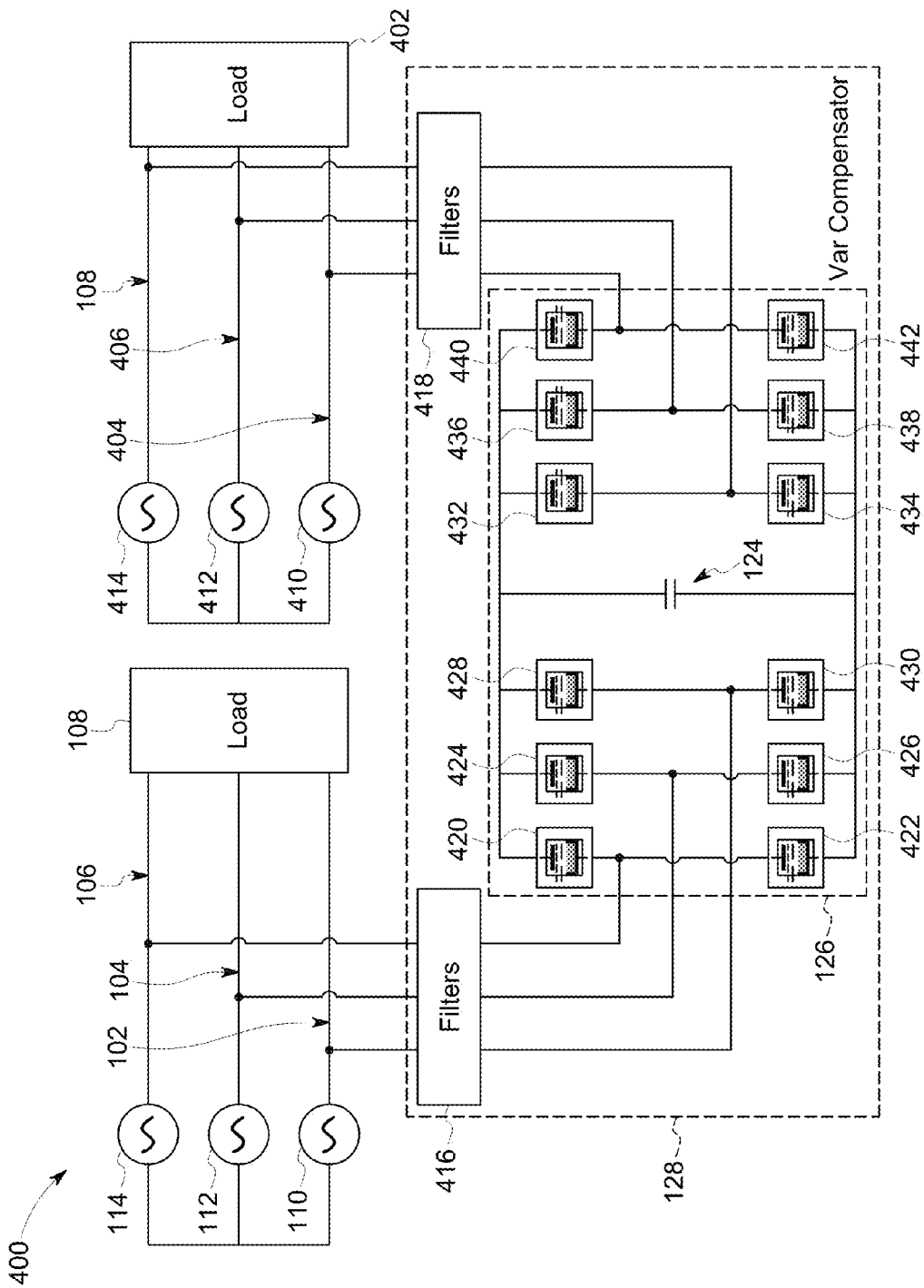
FIG. 4 is a block diagram of yet another alternative FACTS.

FIG. 4 is a block diagram of another exemplary FACTS 400. FACTS 400 includes transmission lines 102, 104, and 106, load 108, power sources 110, 112, and 114, and var compensator 128. FACTS 400 also includes a second load 402 to which real and reactive power are delivered through transmission lines 404, 406, and 408. Real and reactive power delivered to load 402 through transmission lines 404, 406, and 408 is generated by power sources 410, 412, and 414.

In certain embodiments, transmission lines 102, 104, and 106 represent one transmission path within a grid, and transmission lines 404, 406, and 408 represent another transmission path within the grid. In such embodiments, power sources 110, 112, 114, 410, 412, and 414 are synchronous. In alternative embodiments, power sources 110, 112, 114, 410, 412, and 414 are asynchronous, and FACTS 400 further includes one or more additional transformers or power electronics to couple transmission lines 404, 406, and 408 to transmission lines 102, 104, and 106.

Reactive impedance 124 is further coupled to transmission lines 404, 406, and 408 through gas tube switching network 126. Var compensator 128 includes filters 416 and 418 through which reactive impedance 124 is coupled to transmission lines 102, 104, 106, 404, 406, and 408. Filters 416 and 418 are configured to remove unwanted harmonics from power flows on transmission lines 102, 104, and 106, and transmission lines 404, 406, and 408. Gas tube switching network 126 includes gas tube switches 420, 422, 424, 426, 428, 430, 432, 434, 436, 438, 440, and 442. Gas tube switching network 126 is configured to be controlled to share reactive power and real power between transmission lines 102, 104, 106 and transmission lines 404, 406, 408 to balance real and reactive power flows within FACTS 400, and to further regulate transmission line voltages.

Figure 5:
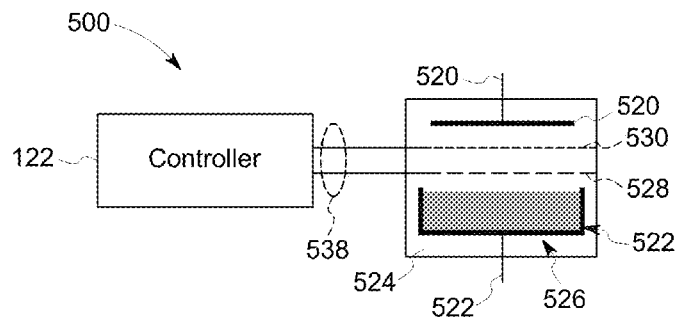
FIG. 5 is a schematic diagram of an exemplary gas tube-switch for use in the FACTS of FIGS. 1-4.
Figure 6:
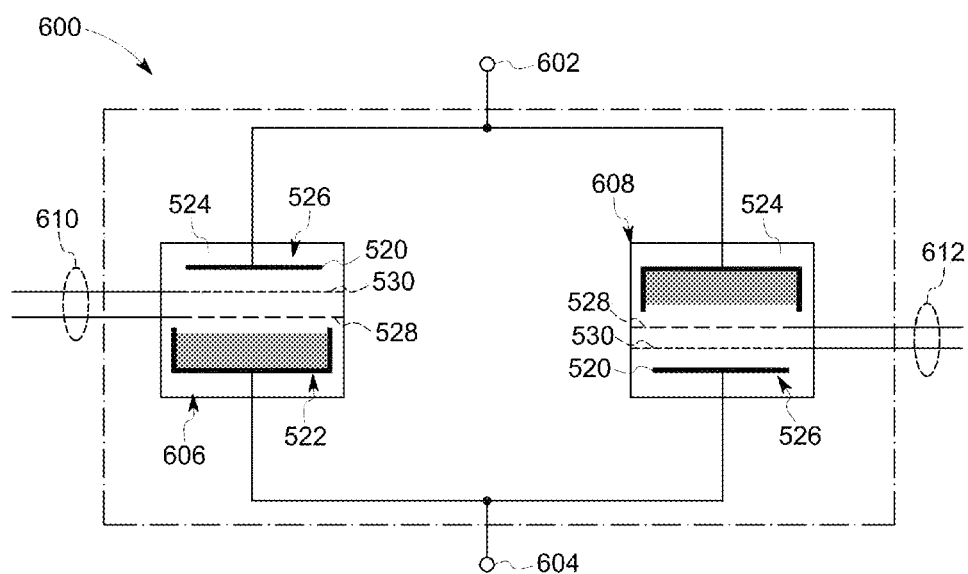
FIG. 6 is a schematic diagram of an alternative gas tube switch for use in the FACTS of FIGS. 1-4.

FIGS. 5 and 6 are schematics of exemplary gas tube-switches 500 and 600 for use in FACTS 100, 200, 300, and 400 (shown in FIGS. 1-4, respectively). Gas tube switch 500 includes an anode 520 opposed to a cathode 522. Anode 520 and cathode 522 are located within a chamber 524 and separated by a discharge gap. Chamber 524 further contains an ionizable gas 526 that occupies the discharge gap. When the switch is closed, ionizable gas 526 is ionized producing a highly conductive plasma extending from anode 520 to cathode 522. Gas tube switch 500, in certain embodiments, includes a keep-alive electrode 528 that maintains a weak plasma between cathode 522 and keep-alive electrode 528, facilitating creation of the highly conducive plasma. Maintaining the highly conductive plasma results in some loss, which is referred to as a forward voltage drop. When the switch is open, ionizable gas 526, which is non-conductive, insulates anode 520 and switching electrode 530, which is characterized by a standoff voltage. The standoff voltage is a function of various design parameters of the switch, including, for example, and without limitation, electrode materials, electrode geometry, discharge gap geometry, properties of ionizable gas 526, pressure within chamber 524, and operating temperature of the switch. Standoff voltages for gas tube switch 500 ranges from 10,000 volts to 300,000 volts inclusively, for example, and without limitation. In alternative embodiments, standoff voltages for gas tube switch 500 may exceed 300,000 volts.

In gas tube switch 500, when commutating, the electric field between anode 520 and cathode 522 is controlled using switching electrode 530. Keep-alive electrode 528 is optionally used to maintain a weak plasma between keep-alive electrode 528 and cathode 522 when the gas tube switch is open, improving repeatability of the closing process and reducing jitter-time. When closing, switching electrode 530 is energized to initialize the ionization of ionizable gas 526 between anode 520 and switching electrode 530 to produce the highly conductive plasma extending from anode 520 to cathode 522. When opening, switching electrode 530 is energized to briefly intercept the current of the highly conductive plasma, thereby facilitating opening of the switch.

Keep-alive electrode 528 and switching electrode 530 for gas tube switch 500 are controlled by controller 122 using control lines 538. In certain embodiments, control lines 538 are referenced to cathode 522.

Controller 122 operates gas tube switch 500 at a switching frequency. The switching frequency, in hertz, quantifies a number of commutations of gas tube switch 500 per second. Gas tube switch 500 commutates by a single transition from open to close or from close to open. Controller 122 operates at a switching frequency between 50 hertz and 20,000 hertz, inclusively. The switching frequency at which controller 122 operates is further determined as a function of the device or components coupled to anode 520 and cathode 522.

In certain embodiments, gas tube switch 500 is combined with a second gas tube switch in a bi-directional switching configuration (shown in FIG. 6). In certain embodiments, gas tube switch 500 is combined with one or more gas tube switches coupled in series, or "stacked." Such a stacked configuration provides a higher standoff voltage than that of a single gas tube switch. For example, if a single gas tube switch has a standoff voltage of 100,000 volts, a stack of three such gas tube switches yields a combined standoff voltage of 300,000 volts. Likewise, if the single gas tube switch has a forward voltage drop of 100 volts, the stack of three has a combined forward voltage drop of 300 volts.

FIG. 6 is a schematic diagram of an exemplary bi-directional gas tube switch 600 for use in FACTS 100, 200, 300, and 400 (shown in FIGS. 1-4, respectively). Bi-directional gas tube switch 600 includes a first terminal 602 and a second terminal 604. Two gas tube switches 606 and 608 are coupled between first terminal 602 and second terminal 604 in an anti-parallel arrangement. Each of gas tube switches 606 and 608, as shown with respect to gas tube switch 500 (shown in FIG. 5), includes anode 520 and cathode 522 disposed in a chamber 524 and separated by a gap. Chamber 524 is filled with ionizable gas 526. Gas tube switches 606 and 608 are controlled using control lines 610 and 612 to energize keep-alive electrode 528 and switching electrode 530 to achieve bi-directional operation. In certain embodiments, control lines 612 are referenced to first terminal 602, and control lines 610 are referenced to second terminal 604.

The above described FACTS provide gas tube switched compensators that improve power factor, voltage regulation, voltage stability, and power flow for the transmission lines. Gas tube switching provides high voltage ratings that eliminate the need for transformers in line with the compensation circuit. Gas tube switching provides low switching losses, facilitating operation at high switching frequencies to improve filtering of harmonics on the transmission lines. FACTS described herein include at least one gas tube switch between a transmission line and a reactive impedance, such as a capacitor or an inductor. In some FACTS described herein, a network of gas tube switches provides fully controllable voltage-ampere reactive (var) compensation, including turn-on and turn-off capability, and bidirectional voltage and current blocking.

An exemplary technical effect of the methods, systems, and apparatus described herein includes at least one of: (a) increasing operating voltage of var compensators; (b) simplifying var compensator design by eliminating transformers to step up generated var to AC line voltage; (c) reducing switching losses; (d) increasing operable switching frequencies; (e) reducing harmonics on transmission lines; (0 reducing conductor losses within var compensators; (g) providing full turn-on and turn-off capability of var compensators; (h) improving power transmission quality and efficiency of FACTS; and (i) improving power factor, voltage regulation, voltage stability, and power flow of FACTS.

Exemplary embodiments of methods, systems, and apparatus for FACTS are not limited to the specific embodiments described herein, but rather, components of systems and/or steps of the methods may be utilized independently and separately from other components and/or steps described herein. For example, the methods may also be used in combination with other non-conventional FACTS, and are not limited to practice with only the systems and methods as described herein. Rather, the exemplary embodiment can be implemented and utilized in connection with many other applications, equipment, and systems that may benefit from increased efficiency, reduced operational cost, and reduced capital expenditure.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A voltage-ampere reactive (var) compensator circuit, comprising:
a gas tube switch configured to be coupled to a transmission line, the transmission line configured to deliver real power and reactive power to a load at an alternating current (AC) line voltage; and
a reactive impedance configured to be coupled to the transmission line at the AC line voltage through said gas tube switch, said reactive impedance configured to modify the reactive power configured to be delivered to the load.

2. The var compensator circuit in accordance with claim 1, wherein said gas tube switch and said reactive impedance are configured to be coupled in series with the transmission line.

3. The var compensator circuit in accordance with claim 1, wherein said gas tube switch and said reactive impedance are configured to be coupled in a shunt circuit with respect to the transmission line.

4. The var compensator circuit in accordance with claim 1, wherein said gas tube switch is configured to be controlled by a controller based on at least one of a measured line voltage and a measure current for the transmission line.

5. The var compensator circuit in accordance with claim 4, wherein said gas tube switch is further configured to be controlled at a switching frequency of at least 500 hertz.

6. The var compensator circuit in accordance with claim 1, wherein the AC line voltage is at least 100 kilovolt.

7. The var compensator circuit in accordance with claim 1, wherein said reactive impedance comprises an inductor configured to produce a current lagging the AC line voltage in phase.

8. A voltage-ampere reactive (var) compensator circuit, comprising:
a gas tube switching network configured to be coupled between a first transmission line and a reactive impedance, the first transmission line configured to deliver real power and reactive power to a load at an alternating current (AC) line voltage, the reactive impedance configured to modify the reactive power configured to be delivered to the load, said gas tube switching network comprising at least one gas tube switch; and
a controller coupled to said gas tube switching network, said controller configured to selectively commutate said at least one gas tube switch to couple the reactive impedance to the first transmission line and apply the AC line voltage to the reactive impedance.

9. The var compensator circuit in accordance with claim 8, wherein the first transmission line includes three phases and the reactive impedance includes three reactive impedances, and wherein said gas tube switching network further comprises three gas tube switches respectively coupled between the three phases of the first transmission line and the three reactive impedances.

10. The var compensator circuit in accordance with claim 9, wherein said three gas tube switches are configured to selectively couple the respective reactive impedances to the first transmission line.

11. The var compensator circuit in accordance with claim 8, wherein said controller is further configured to selectively commutate said at least one gas tube switch based on a measured AC line voltage for the first transmission line and a measured AC line current.

12. The var compensator circuit in accordance with claim 11 further comprising:
a voltage sensor coupled to the first transmission line and said controller, said voltage sensor configured to detect the measured AC line voltage; and
a current sensor coupled to the first transmission line and said controller, said current sensor configured to detect the measured AC line current.

13. The var compensator circuit in accordance with claim 12, wherein said controller is further configured to:
compute a phase difference between the measured AC line voltage and the measured AC line current; and
selectively regulate said gas tube switching network based on the phase difference.

14. The var compensator circuit in accordance with claim 8, wherein said gas tube switching network is further coupled between the reactive impedance and a second transmission line, and wherein said controller is further configured to regulate said gas tube switching network to transfer reactive power generated by the reactive impedance and real power present on the transmission line to the second transmission line.

15. A flexible alternating current (AC) transmission system (FACTS), comprising:
a transmission line coupled between a power source and a load, said transmission line configured to deliver real power and reactive power to the load at an AC line voltage;
a gas tube switching network coupled to said transmission line, said gas tube switching network comprising a plurality of gas tube switches;
a controller coupled to said gas tube switching network, said controller configured to regulate said plurality of gas tube switches based on a measured AC line voltage and a measured AC line current; and
a reactive impedance configured to be coupled to said transmission line through said gas tube switching network at the AC line voltage, said reactive impedance configured to generate additional reactive power.

16. The FACTS in accordance with claim 15, wherein said reactive impedance comprises at least one fixed capacitance and at least one fixed inductance.

17. The FACTS in accordance with claim 15, wherein said plurality of gas switches is each operable to switch at voltages exceeding 100 kilovolts.

18. The FACTS in accordance with claim 15, wherein said controller is further configured to:
detect current harmonics on said transmission line; and
regulate said gas tube switching network such that the additional reactive power is includes an inverse of the current harmonics, thereby cancelling the current harmonics on said transmission line.

19. The FACTS in accordance with claim 18, wherein said controller is further configured to commutate said plurality of gas tube switches at a switching frequency of at least 500 hertz.

20. The FACTS in accordance with claim 15, wherein said controller is further configured to:
regulate said plurality of gas tube switches to generate the additional reactive power; and
subsequently regulate said plurality of gas tube switches to modify the additional reactive power based on a second measured AC line voltage and a second measured AC line current for said transmission line.

* * * * *